United States Patent
Reid et al.

(10) Patent No.: US 7,216,188 B2
(45) Date of Patent: May 8, 2007

(54) TECHNIQUES FOR ACCESSING DEVICES THROUGH A SET OF SERIAL BUSES AUTOMATICALLY SETTING UNIQUE ENCLOSURE ADDRESSES AND DETECTING NON-UNIQUE ENCLOSURE ADDRESSES UPON INITIALIZATION

(75) Inventors: Geoffrey A. Reid, Littleton, MA (US); Steven D. Sardella, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 247 days.

(21) Appl. No.: 10/402,334

(22) Filed: Mar. 29, 2003

(65) Prior Publication Data

US 2004/0190545 A1    Sep. 30, 2004

(51) Int. Cl.
G06F 15/173     (2006.01)
G06F 3/00     (2006.01)

(52) U.S. Cl. .............................. 710/74; 710/9; 710/72; 714/4; 714/25; 714/48; 711/112; 711/144; 709/22; 709/224; 709/245

(58) Field of Classification Search ................ 710/72, 710/74, 9; 714/4, 48, 25; 711/112, 144; 709/224, 245, 228, 22
See application file for complete search history.

(56) References Cited

U.S. PATENT DOCUMENTS 5,944,798 A * 8/1999 McCarty et al. ............ 709/251
6,351,831 B1 * 2/2002 Sawdy et al. ................ 714/48
6,697,875 B1 * 2/2004 Wilson ........................ 709/245
6,829,657 B1 * 12/2004 Lynn et al. ..................... 710/9
6,988,136 B2 * 1/2006 Sicola et al. ................ 709/224
7,010,607 B1 * 3/2006 Bunton ........................ 709/228
2003/0140099 A1   7/2003 Beer et al.
2004/0193791 A1 * 9/2004 Felton et al. ................ 711/112

FOREIGN PATENT DOCUMENTS

WO     WO 02/03610     1/2002

OTHER PUBLICATIONS

Benner A F: "Fiber Channel: Gigabit Communications and I/O for Computer Networks" Fiber Channel: the Basics, XX XX, 1996, pp. 277-291, XP002110780 Section '16.4.1! to Section '16.4.3!.

* cited by examiner

Primary Examiner—Tammara Peyton
(74) Attorney, Agent, or Firm—BainwoodHuang

(57) ABSTRACT

In a system including multiple enclosures, unique enclosure addresses can be set automatically via software. The enclosure addresses may be stored in non-volatile memory within the enclosures. In a storage system, several enclosures contain several disk drives, wherein each disk drive requires a unique device address related to the enclosure in which it resides. A unique address is automatically assigned via software to each enclosure.

28 Claims, 21 Drawing Sheets

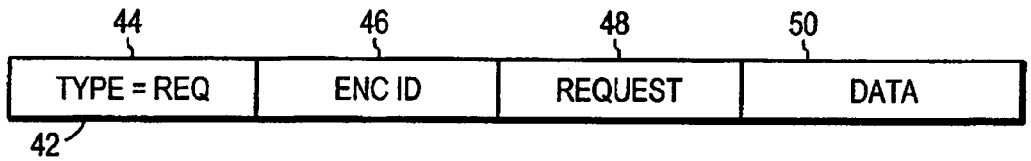
FIG. 7 REQUEST COMMAND
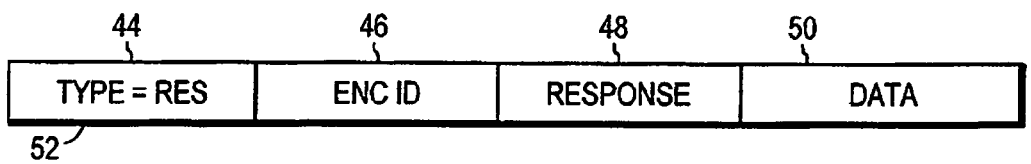
FIG. 8 RESPONSE MESSAGE
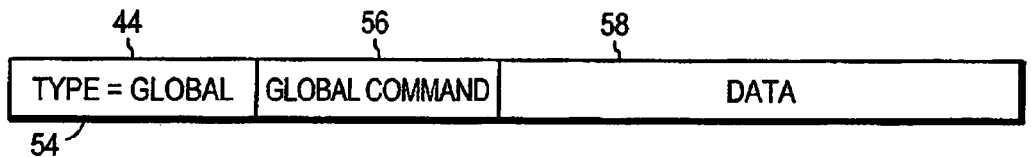
FIG. 9 GLOBAL COMMAND
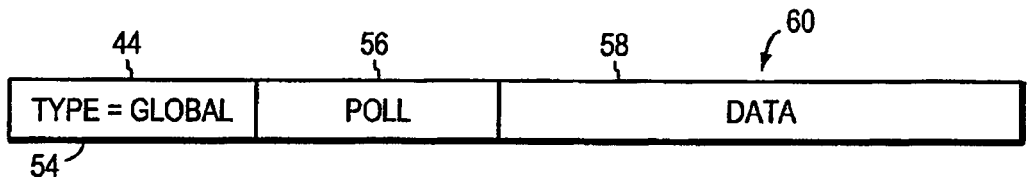
FIG. 10 GLOBAL POLL COMMAND
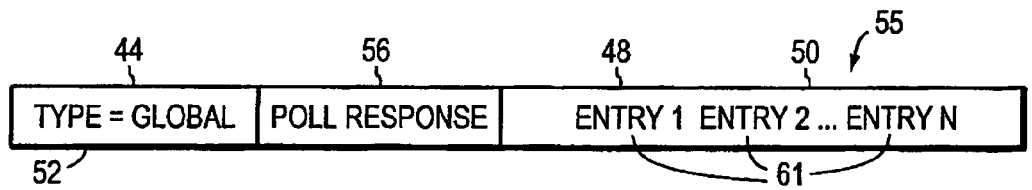
FIG. 11 POLL RESPONSE MESSAGE

INDEX COMMAND

DUPLICATE INDEX COMMAND

AUTOCONFIG COMMAND

AUTOCONFIG RESPONSE

TECHNIQUES FOR ACCESSING DEVICES THROUGH A SET OF SERIAL BUSES AUTOMATICALLY SETTING UNIQUE ENCLOSURE ADDRESSES AND DETECTING NON-UNIQUE ENCLOSURE ADDRESSES UPON INITIALIZATION

FIELD OF THE INVENTION

The present invention relates generally to storage systems, and more particularly to addressing of Fibre Channel disk drives in a storage system.

BACKGROUND OF THE INVENTION

Many current storage systems utilize an industry standard serial channel protocol known as Fibre Channel Arbitrated Loop. In accordance with this protocol, disk drives communicate with a server via a high speed serial link. The disk drives and server are interconnected in a ring or loop topology. Each disk drive on the loop has an individual address assigned to it, known as an Arbitrated Loop Physical Address (ALPA). Each Fibre Channel Arbitrated Loop can include up to 126 ALPAs.

Storage systems are commonly designed in a modular fashion, wherein a number of disk drives are installed within a standard rack mount enclosure such as a 3U enclosure. The enclosures are in turn installed in a rack mount chassis and interconnected to form the storage system. Individual disk ALPAs are assigned based upon the disk's position within the enclosure, and based upon the identity of the enclosure within the system. In some current systems, enclosure identity is determined through manual switch settings. This is disadvantageous because the switches consume valuable space on the enclosure and because human error can cause addressing problems. In other current systems, intelligence is provided in the rack mount chassis itself to set the enclosure addresses, disadvantageously adding cost and complexity to the chassis. It would be desirable to provide a disk drive addressing scheme that avoids these inadequacies and shortcomings.

SUMMARY OF THE INVENTION

In accordance with the principles of the invention, in a system including multiple enclosures, unique enclosure addresses can be set automatically via software. The enclosure addresses may be stored in non-volatile memory within the enclosures. The invention is useful in systems having several enclosures, each enclosure containing several devices, wherein each device requires a unique device address related to the enclosure in which it resides. For example, the invention is useful in Fibre Channel storage systems wherein each disk drive requires a unique address.

In accordance with more particular aspects of the invention, the enclosures are interconnected by a communications medium, and wherein the software causes messages to be exchanged between the enclosures via the communications medium to set the enclosure addresses. According to one embodiment, a method can cause enclosure addresses to be sent by sending a poll message, and then receiving a response message in response to the poll message, the response message including enclosure addresses for each enclosure in the system. The method then ascertains whether the enclosure addresses are unique. If the enclosure addresses are not unique, the method ascertains the position of an enclosure that has a non-unique address, and then sends an index message to the enclosure at the ascertained position. The index message includes a unique enclosure address for the enclosure at the ascertained position.

Similar apparatus and program products are provided for automatically setting enclosure addresses.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 7 shows the format of a Request Command.

FIG. 8 shows the format of a Response Message.

FIG. 9 shows the format of a Global command.

FIG. 10 shows the format of a Global Poll command.

FIG. 11 shows the format of a Poll Response message.

DETAILED DESCRIPTION OF EXEMPLARY EMBODIMENTS

Figure 1:
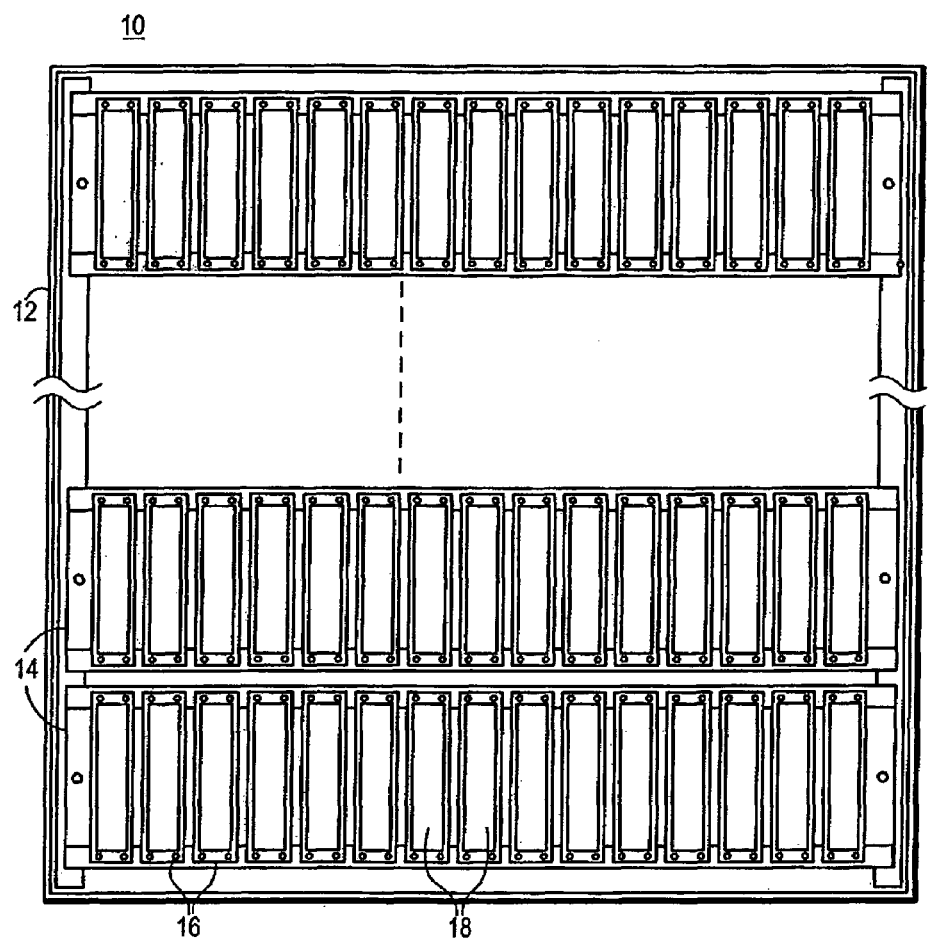
FIG. 1 is a representation of a rack mount system including several storage enclosures.
Figure 2:
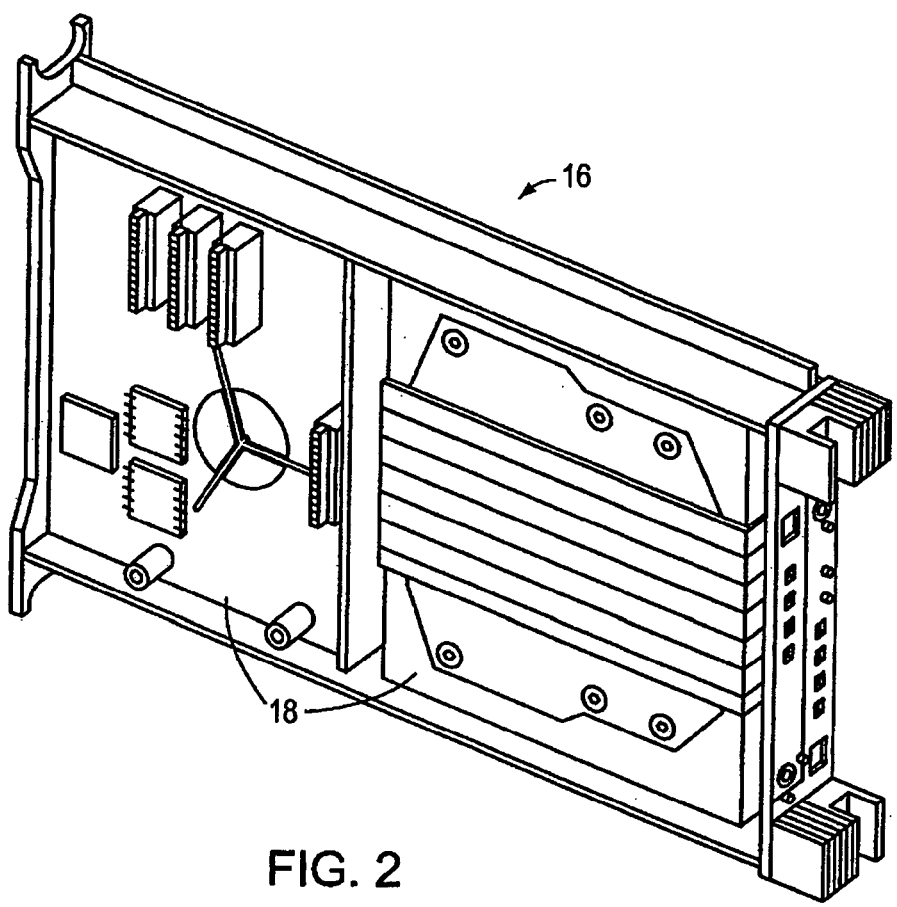
FIG. 2 is an assembly view of a carrier that contains two disk drives.
Figure 3A:
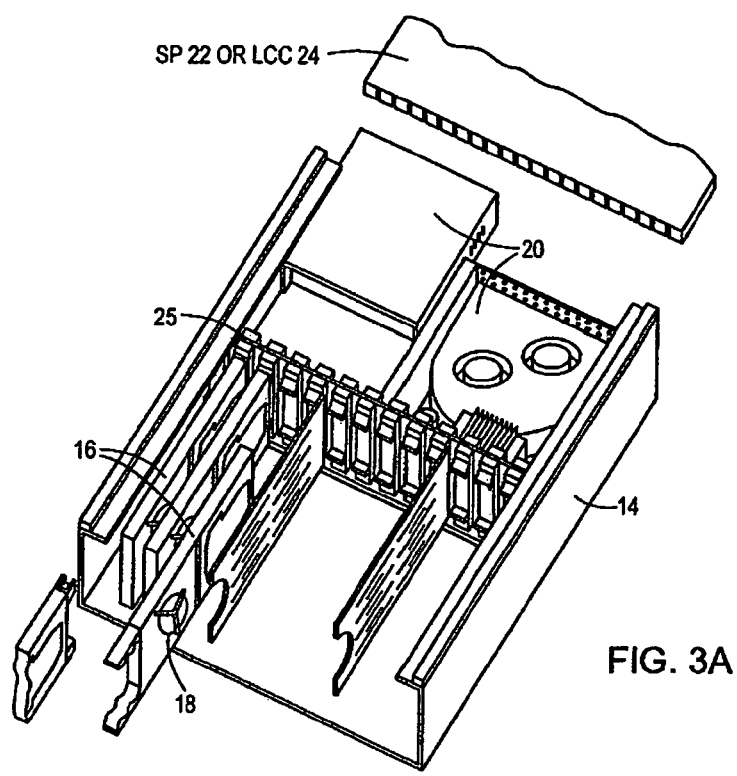
FIGS. 3A and 3B are front and rear views of the disk drive enclosures of FIG. 1.
Figure 3B:
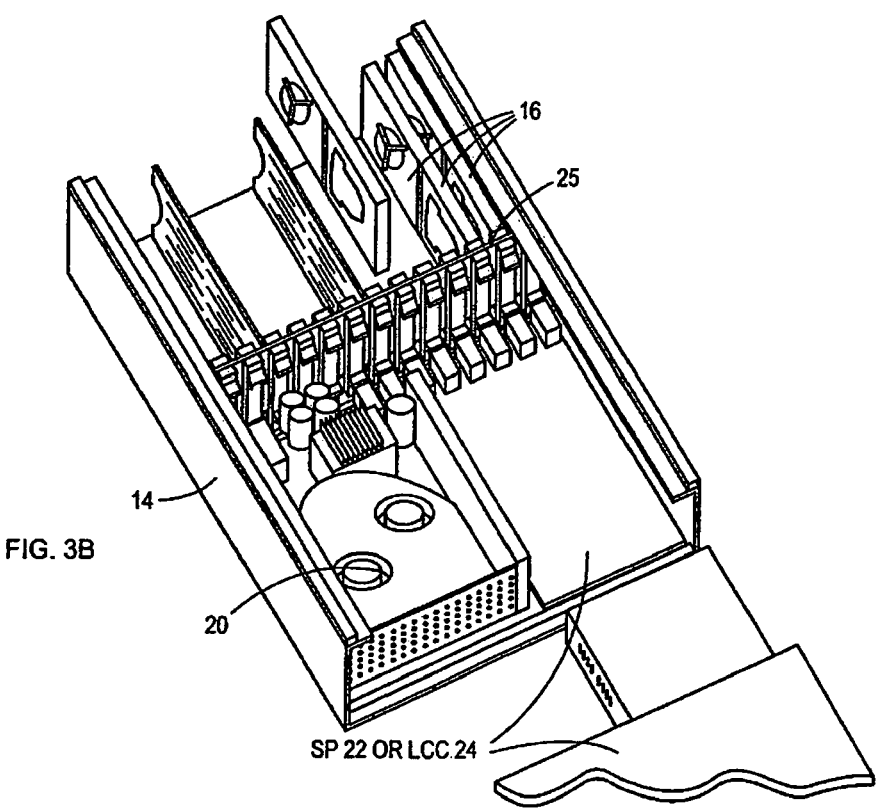
Figure 4:
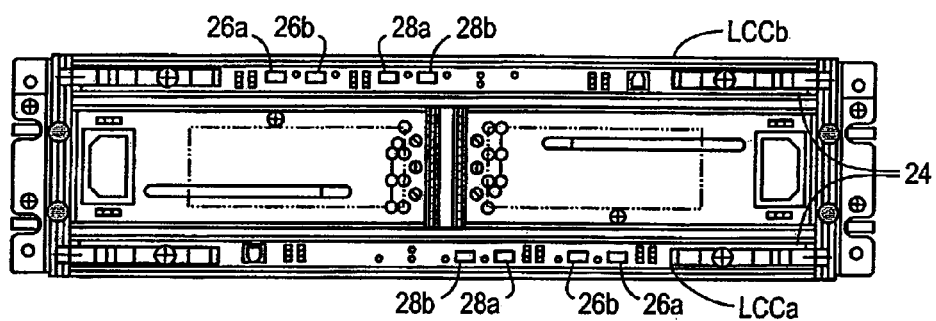
FIG. 4 is a rear view of a disk drive enclosure showing two power supplies and either two system processors or two link control cards.

Referring to FIG. 1, there is shown an example of a storage system 10 in which the present invention may be employed. A rack mount cabinet 12 includes several storage enclosures 14. Each storage enclosure 14 is preferably an EIA RS-310C 3U standard rack mount unit. In accordance with the principles of the invention, each storage enclosure 14 has installed therein several disk drive carriers 16, each carrier 16 including several disk drives 18. In FIG. 2 there is shown a carrier 16 including two disk drives 18. In FIG. 3 there are shown front and rear views of the enclosure 14. The enclosure 14 is shown to include 15 carriers 16. Each enclosure therefore contains 30 disk drives 18. The disk drives 18 are preferably Fibre Channel disk drives interconnected via a Fibre Channel Arbitrated Loop (FC-AL); however, the drives 18 may be compatible with other storage technologies such as Serial Advanced Technology Attachement (SATA) or Serial Attached SCSI (SAS). Up to eight enclosures 14 can be installed within the cabinet 12. Up to 120 disk drives can be included on a single FC-AL. So, 15 drives 18 per enclosure 14 are included on one FC-AL, while the other 15 drives 18 are included on a second FC-AL. The number of drives 18 per enclosure 14 and the number of enclosures 14 are shown by way of example; the invention is not limited to any particular arrangement.

As seen in FIG. 3, each enclosure houses two power supplies 20 and two system processors (SPs) 22 or two Link Control Cards (LCCs) 24. The SPs 22 or LCCs 24 are coupled to the disk drive carriers 16 via a midplane 25. Redundant components are provided for high availability. Typically, the first enclosure, referred to as enclosure 0, includes SPs 22, while the rest of the enclosures include LCCs 24. The SPs 22 control certain overall system functions, while the LCCs 24 serve to connect the disk drives 18 together on an FC-AL.

Figure 5:
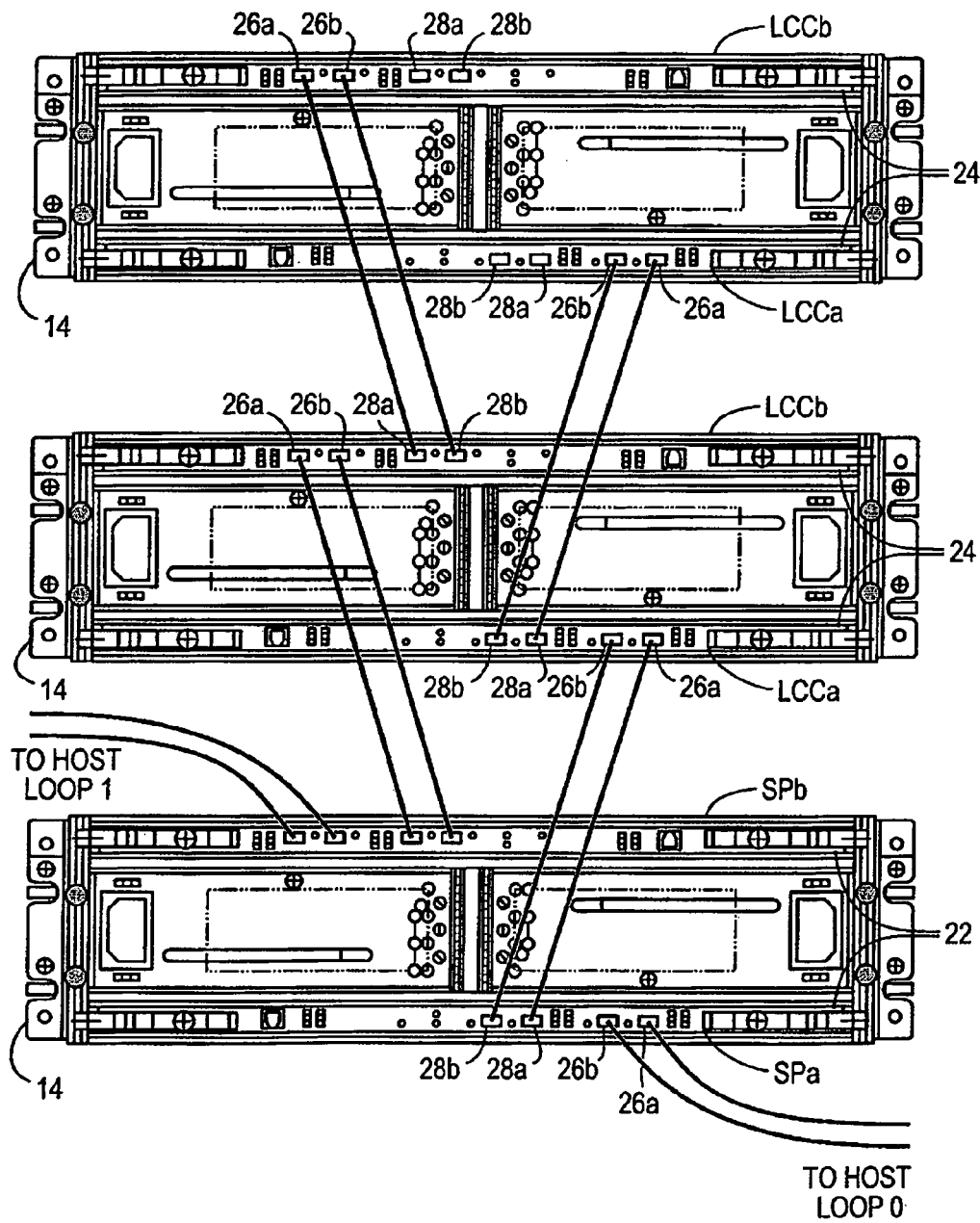
FIG. 5 is a rear view of the system of FIG. 1, showing how some of the separate enclosures are interconnected on Fibre Channel loops.

More particularly, referring to FIG. 5, there is shown an example of the manner in which three enclosures 14 are interconnected on a pair of redundant FC-ALs. The bottom enclosure 14 contains SPs 22, while the other two enclosures contain LCCs 24. The SPs 22 and LCCs 24 are arranged within their enclosures 14 such that they are inverted with respect to each other. The lower SPs 22 or LCCs 24 in each enclosure 14 are referred to as SPa or LCCa respectively. The upper SPs 22 or LCCs 24 in each enclosure 14 are referred to as SPb or LCCb respectively. Each SPa 22 or LCCa 24 includes two primary ports 26a,b and two expansion ports 28a,b. A first pair of FC-ALs herein referred to as "loop 0" interconnects the SPa and LCCa modules. Accordingly, an FC-AL enters a primary port, for example 26a, where it is connected to 15 of the drives. The FC-AL then extends out of the enclosure 14 via the expansion port 28a. The expansion port 28a is then interconnected via a cable 30 to a primary port 26a on the next enclosure in the cabinet, as shown in FIG. 5. A second FC-AL enters the second primary port 26b, where it is connected to the other 15 drives. The second FC-AL extends out the second expansion port 28b to connect to the second primary port 26b on the next enclosure 14, as shown. The remaining LCCa modules are connected in the same way, thus providing two separate FC-ALs connecting 120 drives each. Meanwhile, another pair of FC-ALs herein labeled "loop 1" similarly interconnects the SPb and LCC b modules.

In order to properly configure each FC-AL, each disk drive 18 on the FC-AL must be assigned a unique Arbitrated Loop Physical Address (ALPA). Each disk is assigned its ALPA based on its position in the enclosure 14 and based on an enclosure address, herein referred to as an Enclosure ID. Logic within each enclosure 14 assigns a loop ID to each disk drive 18 based on its position in the enclosure 14 and based on the Enclosure ID. For example, if the first Enclosure ID is "0", then the 15 drives 18 in the first enclosure 14 have loop IDs of 0–14. If the second Enclosure ID is "1", then the 15 drives 18 in the second enclosure 14 have loop IDs of 15–29. So, the fourth disk drive 18 in an enclosure 14 with Enclosure ID 0 would have a loop ID of "3", while the fourth disk drive 18 in an enclosure 14 with Enclosure ID 1 would have a loop ID of "19". The loop IDs are further translated into unique ALPAs for each disk drive 18. In accordance with the principles of the invention, the Enclosure ID is software based and is automatically assigned.

The SPs 22 and LCCs 24 are in communication with one another for enclosure and system management purposes. The enclosures 14 may be interconnected in any of a number of ways in order to enable this communication. For example, an out-of-band communications bus, such as an I2C bus, could be provided for interconnecting the enclosures. Or, the enclosure and system management information may be communicated in-band over the FC-AL itself. In a preferred embodiment, the FC-AL physical loops are used for enclosure management purposes. Low speed enclosure management signals are driven over the high speed Fibre Channel signals on the cables via a process herein referred to as "Diplexing". The mechanism by which the low speed signals are driven on the cables is fully described in commonly owned U.S. Pat. No. 5,901,151, to Bleiweiss et al., entitled "System for Orthogonal Signal Multiplexing".

Figure 6:
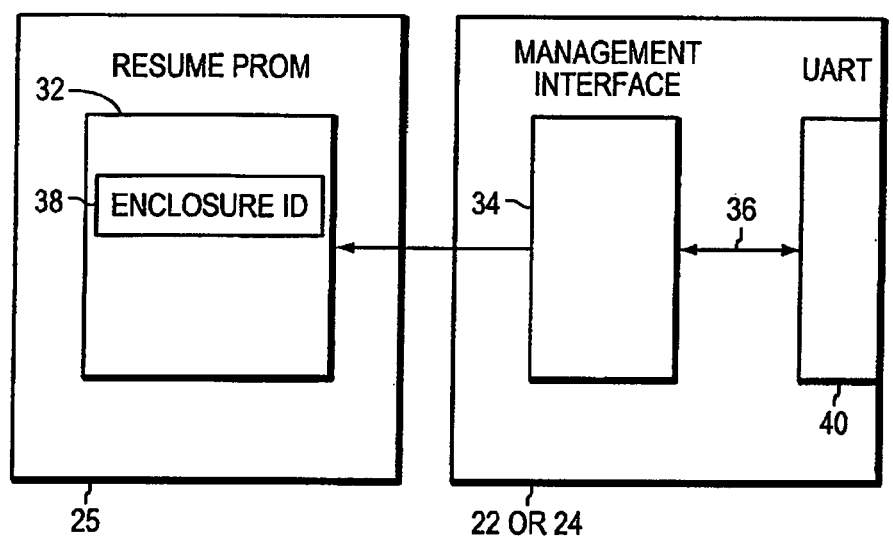
FIG. 6 is a block diagram of the Enclosure ID functionality that resides on the system processor, link control cards, and midplane.

Referring to FIG. 6, the midplane 25 includes, amongst other components, a non-volatile memory 32 herein referred to as a Resume PROM. The functionality of the Resume PROM is fully described in commonly-owned U.S. patent Ser. No. 10/330,806, to Sardella, entitled "A Method and Apparatus for Preserving Data in a High Availability System", to Sardella et al., herein incorporated by reference. The Resume PROM 32 stores certain system critical information, including the Enclosure IDs. SPs 22 and LCCs 24 also include local Resume PROMs in which they store their Enclosure IDs. Upon power up or reset, the SPs 22 and LCCs 24 make a copy of the Enclosure ID 38 for the enclosure 14 in which they reside in the Resume PROM 32 on the midplane 25. SPs 22 or LCCs 24 can update the contents of the Resume PROM, including the Enclosure IDs, as needed. As shown, a management interface 34 decodes management signals from a bus 36 on which management messages are sent and received in order to set the Enclosure IDs 38 in the Resume PROM 32. The bus 36 is coupled to the Fibre Channel cable 30 via a UART 40. The storage of the Enclosure ID 38 in the Resume PROM 32 eliminates the need for external switches or chassis buses, since the Enclosure ID 38 can now be set by software. Furthermore, it enables automatic Enclosure ID assignment, providing for greater system addressing flexibility than heretofore available. LEDs may be provided on the enclosures 14 to indicate the currently set Enclosure IDs for each enclosure 14.

In accordance with the principles of the invention, the management interfaces 34 on the SPs 22 and/or LCCs 24 can set Enclosure IDs 38 through software by initiating and responding to management messages to be further described. In accordance with a first embodiment, the SPs 22 and/or LCCs 24 can send address based commands and Global commands onto the management communication medium. As previously mentioned, the management communication medium may be an out-of-band bus, an in-band protocol, or a management signaling mechanism that shares the Fibre Channel physical loop. For purposes of simplicity the management communication medium is herein referred to as a bus 36.

One such address based command is a Request command. A Request command 42 is shown in FIG. 7. The Request command 42 includes a type field 44 that identifies it as a request type command; an Enclosure ID field 46 in which the Enclosure ID of the enclosure the SP is sending the command to is placed; a Request field 48 indicating the type of request; and a data field 50 which may or may not contain data depending upon the type of request indicated by the Request field 48. When a Request command 42 is issued to a particular Enclosure ID, the LCC in the enclosure 14 having the Enclosure ID responds to the Request command with a Response message 52. The contents of the Response message 52 depends upon the particular type of Request command. The Response message 52 is shown in FIG. 8. The Response message has the type field 44 identifying it as a Response message; the Enclosure ID field 46 that contains the Enclosure ID 38 of the responding enclosure 14; a Response field 48 indicating the type of response; and a data field 50 that may include various types of data depending upon the type of request being responded to.

The SPs 22 and/or LCCs 24 can also send Global commands 54 on the bus 36. The format of a Global command 54 is shown in FIG. 9. The type field 44 indicates a Global command 54. The following field 56 indicates the type of Global command being issued. The following field 58 may or may not contain data. Referring to FIG. 10, in accordance with a particular Global command 54 herein referred to as a Poll command 60 (as identified by the Global type field 56), an SP 22 sends a Poll command 60 onto the bus 36. Each enclosure 14 responds to the Poll command 60 by forwarding the Poll command to the next enclosure in the loop. The last enclosure 14 on the loop returns a Poll Response message 55 including an entry 61 and forwards the Poll Response message 55 back down the loop. Each successive enclosure 14 adds its entry 61 to the Poll Response message 55. The Poll Response message 55 is eventually received by the SP 22. Alternatively, each enclosure 14 responds to the Poll command 60 by adding an entry 61 in the data field 50 of a Poll response message 55 and forwarding the Poll response message 55 to the next enclosure 14 in the loop.

An example of a Poll response message 55 is shown in FIG. 11. The Poll Response message 55 is identified by the type field 44 indicating a Global response, and a global type field 56 indicating a Poll Response. The Poll response message 55 has a variable length data field 50 including an entry 61 from each enclosure 14, so the SP 22 can now ascertain how many enclosures 14 are installed in the system 10. The entries 61 contain, amongst other data, the currently set Enclosure ID 38 of the enclosure 14 making the respective entry 61.

Figure 12:
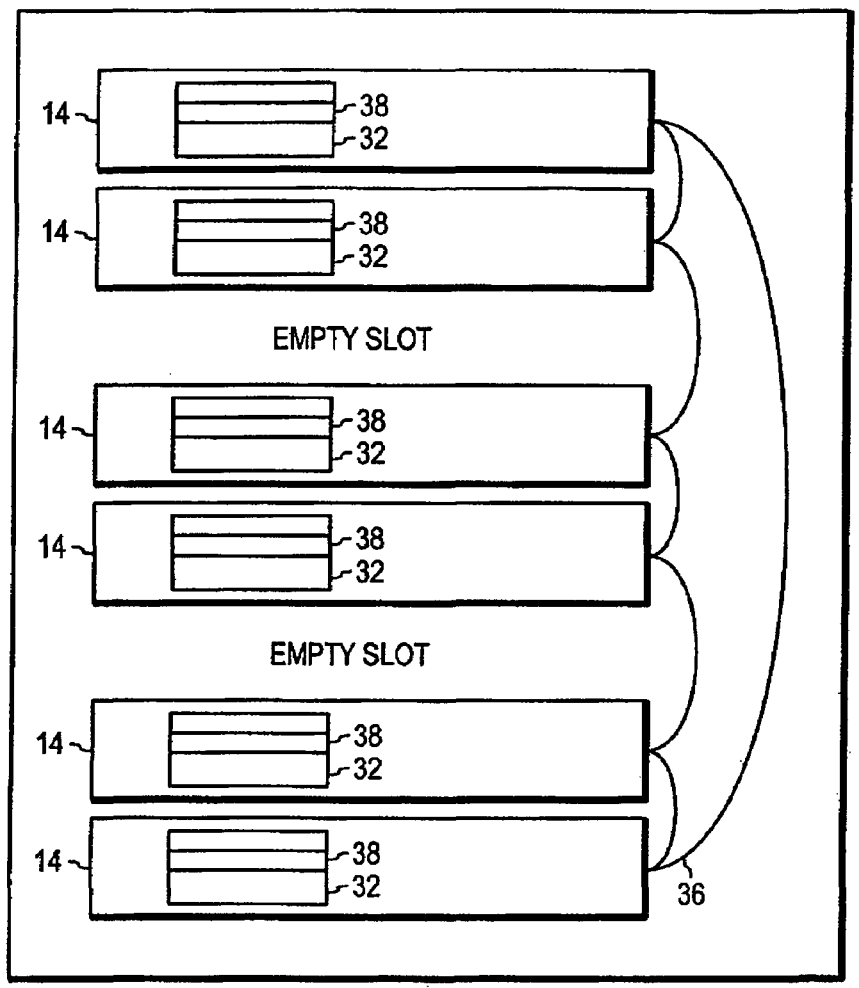
FIG. 12 shows a storage system in which six enclosures are installed.

According to a first example, referring to FIG. 12, the system 10 shown includes six enclosures 14. The system 10 has not been initialized, thus none of the enclosures' IDs 38 are currently valid. In accordance with the invention, an SP 22 injects a poll message onto the bus 36. Each enclosure on the bus 36 adds its Enclosure ID 38 to the poll response message 55. Since none of the enclosures 14 are initialized, their Enclosure IDs 38 may appear as '0' or as a code that is invalid as an enclosure address and therefore indicates that the enclosure is uninitialized. Upon receipt of a poll response message 55 wherein Enclosure IDs 38 overlap (e.g. two or more enclosures return an enclosure address of '0'), or wherein any Enclosure ID 38 is invalid, the SP 22 now sets the Enclosure IDs 38.

Figure 13:
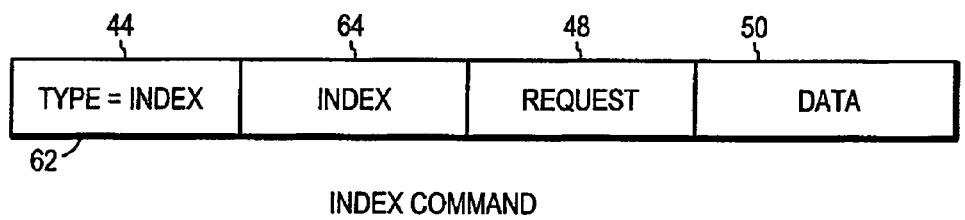
FIG. 13 shows the format of an Index command.

Since none of the enclosures 14 in the current example contain valid Enclosure. IDs 38, address based Request commands 42 cannot be used, because the enclosures 14 cannot distinguish themselves from one another. So, in accordance with the principles of the invention, a new type of command is provided, herein referred to as an Index command 62. The Index Command is shown in FIG. 13. An index command 62 is similar to a Request command 42 except the Index command 62 provides an index field 64 instead of an Enclosure ID field 46. The index field 64 represents the relative position of an enclosure 14 with respect to the enclosure 14 containing the SP 22. For example, if the SP 22 (located in the first enclosure at the bottom of the cabinet 12) needs to communicate with the enclosure 14 that is 3 enclosures away from itself in the cabinet 12, which as shown is in the fifth location in the cabinet 12, the SP 22 sends an Index command 62 with an index field 64 containing "3". This Index command 62 is received by the first enclosure 14. Because the value of the index field 64 is not equal to "1", the enclosure subtracts "1" from the index field, changing the field to "2", and passes the Index command 62 on to the second enclosure 14. The second enclosure 14 also sees that the index field 64 does not contain "1", and so subtracts "1" from the index field 64, changing it to "1", and passes the Index command 62 on to the third enclosure 14. The third enclosure sees an index field of "1" and therefore understands that it is the destination for the Index command 62.

Figure 14:
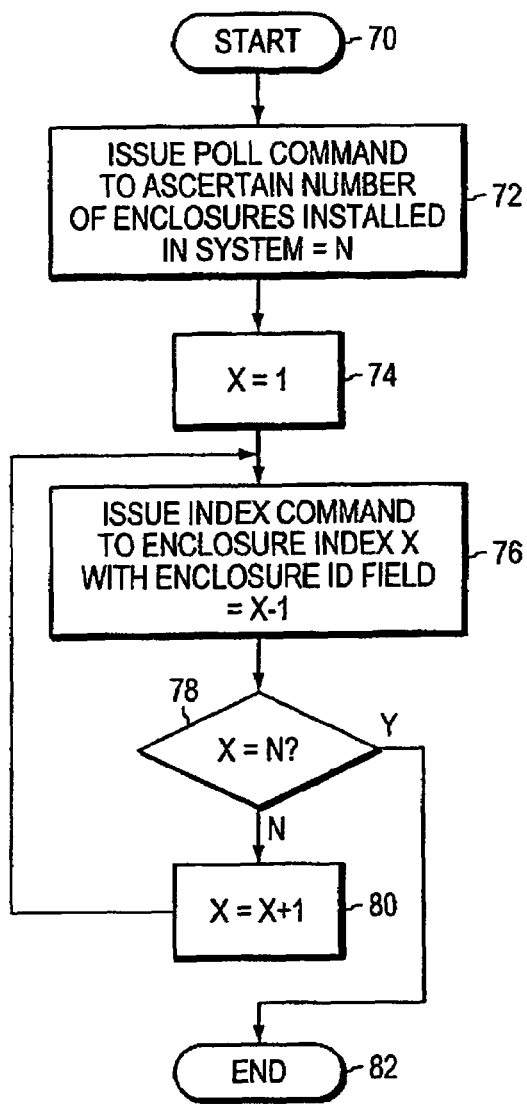
FIG. 14 is a flow diagram showing one way Enclosure IDs may be set upon system initialization.

In accordance with the invention, Poll commands 60 and Index commands 62 are used to assign Enclosure IDs 38. According to one method, the SP 22 first issues a Poll command 60. The Response message 55 issued in response to the Poll command will include one entry 61 in its data field for each installed enclosure 14. The SP 22 therefore knows, via the entry count, how many enclosures 14 besides itself are installed. The SP 22 can then issue Index commands 62 to set Enclosure IDs 38. The index command 62 includes in its data field 50 the Enclosure ID 38 that the SP 22 is assigning to the enclosure 14 at that index. Referring to FIG. 14, the Poll commands 60 and Index commands 62 are used by the SP 22 to set enclosure addresses 38 as follows:

1. Upon initialization (70), the SP 22 issues a Poll command 60 to determine the number N of Enclosures 14 installed in the system besides its own enclosure (72). (The SP 22 resides in the enclosure 14 with Enclosure ID=0.)
2. The SP 22 initializes a variable X=1 (74).
3. The SP 22 sends an Index command 62 with an index field 64 containing X, the index type field 64 indicating that this command will set an enclosure address, and the data field 50 including an Enclosure ID value of X (76)
4. The SP 22 checks to see if X=N (78).
5. If X does not equal N, the SP increments X (80) and issues another Index command as in step 76.
6. The SP 22 continues to issue Index commands until X=N, indicating that all enclosure addresses have been set (82).

Figure 15:
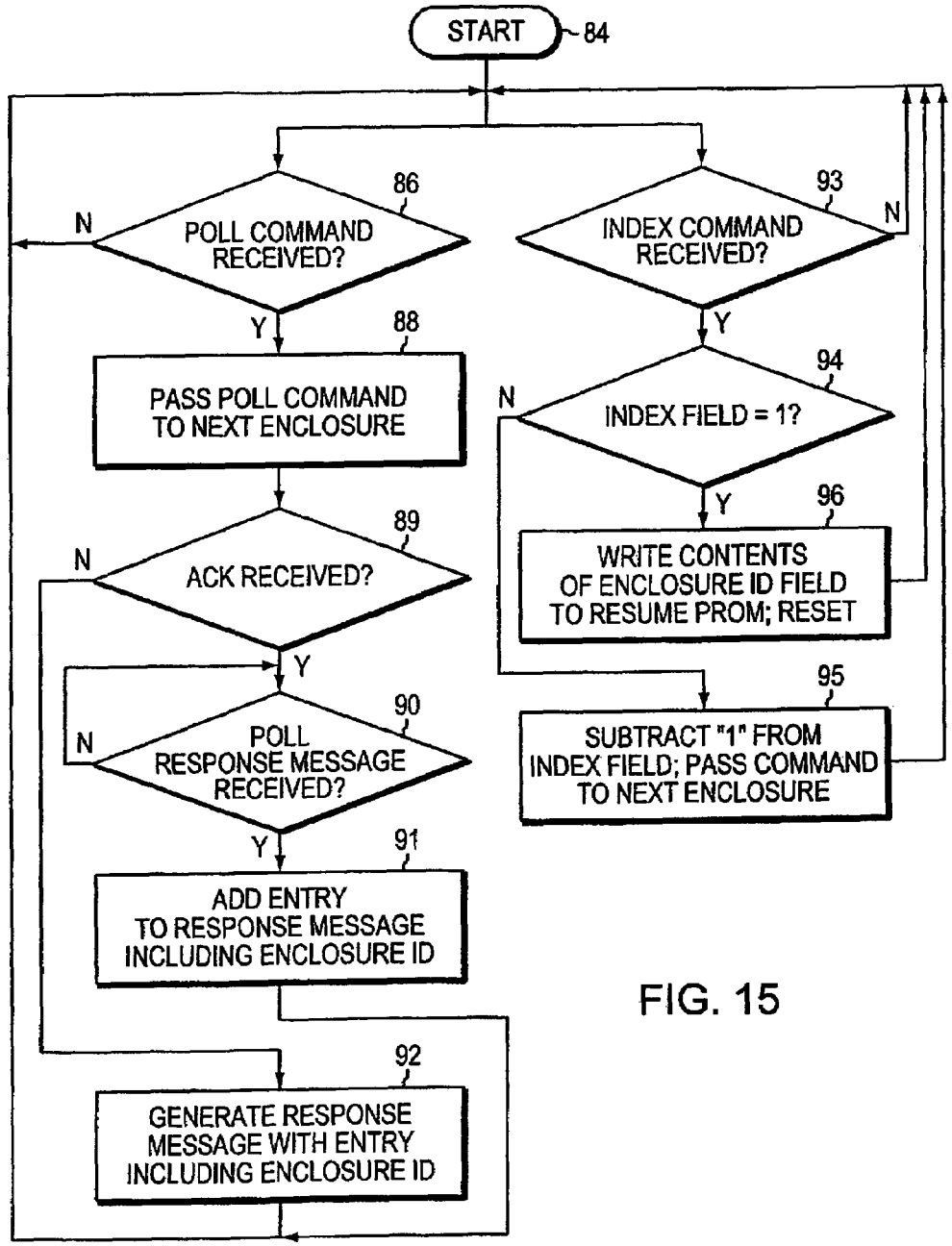
FIG. 15 is a flow diagram of how enclosures respond to Poll commands and Index commands.

Referring to FIG. 15, from the perspective of an enclosure 14, Enclosure IDs 38 are set as follows:

1. Upon initialization (84), enclosures 14 always monitor for Poll commands 60 (86). When a Poll command 60 is received, the enclosure 14 attempts to pass the Poll command 60 to the next enclosure 14 (88). If the enclosure 14 receives an acknowledgement from the next enclosure 14 (89), the enclosure 14 awaits a Poll response message 55 (90). When the Poll response message 55 is received, the enclosure 14 adds an entry 61 to the Poll response message 55 (91). The entry includes the enclosure's currently set Enclosure ID 38. If the enclosure 14 does not receive an acknowledgement after forwarding the Poll command 62 (89), then the enclosure 14 is the last enclosure on the loop. In this case, the enclosure 14 generates the Poll response message 55 including an entry 61 that contains the enclosure 114's Enclosure ID (62).

2. Enclosures 14 always monitor for Index commands 62 (93). When an Index command 62 is received, the enclosure 14 checks the index field to see if it contains a value of "1" (94).

3. If the index field does not contain a value of "1", the enclosure subtracts "1" from the index field and passes the command to the next enclosure (95).

4. If the index field does contain a value of "1", the enclosure sets its Enclosure ID by writing the contents of the Enclosure ID field to its Resume PROM (96). The enclosure resets so that the contents of its Resume PROM are written to the Resume PROM 32 on the midplane 25.

It will be clear to one skilled in the art that the previously described algorithm is only one of many that might be employed. For example, the SP 22 could choose to initialize the variable X to 0 rather than 1, and subsequently issue Index commands 62 to index X with Enclosure ID field set to X, then increment X and re-issue commands until X=N−1. Or, the SP 22 could choose to initialize the variable X to N rather than 1, and subsequently issue Index commands 62 to index X with Enclosure ID field set to X−1, then subtract 1 from X and re-issue commands until X=1. Alternatively, the index field 64 may range from X to N while the data field 50 in each index command issued may be any unique value.

The previously described method for automatically setting Enclosure IDs 38 provides greater system flexibility than has heretofore been available. For instance, Enclosure IDs 38 can be changed at any time. They can be set such that they are contiguous or non-contiguous. The Enclosure IDs 38 are not cabinet position dependent, therefore spaces can be left in the cabinet 12 but contiguous addressing can still be maintained. Furthermore, as spaces in the cabinet 12 are filled in with new enclosures 14, all enclosures 14 can be assigned new Enclosure IDs 38 to maintain contiguous addressing, or the old Enclosure IDs 38 can be maintained while a new Enclosure ID 38 is assigned to the new enclosure 14. Note also that the method works equally well in a storage system wherein some of the enclosures 14 are of the traditional type where the enclosure address is set manually, for example via a switch. If for example one Enclosure ID 38 cannot be changed because it is manually assigned, then the automatic Enclosure ID assignment method will ensure that those Enclosure IDs that can be automatically assigned are different than the manually assigned Enclosure IDs.

The invention as so far described works well for initializing a new system in which all enclosures 14 are assumed to need their Enclosure IDs 38 set. According to more particular aspects of the invention, the SP 22 can set particular Enclosure IDs 38 as enclosures 14 are added or removed from an already operational system.

Figure 16:
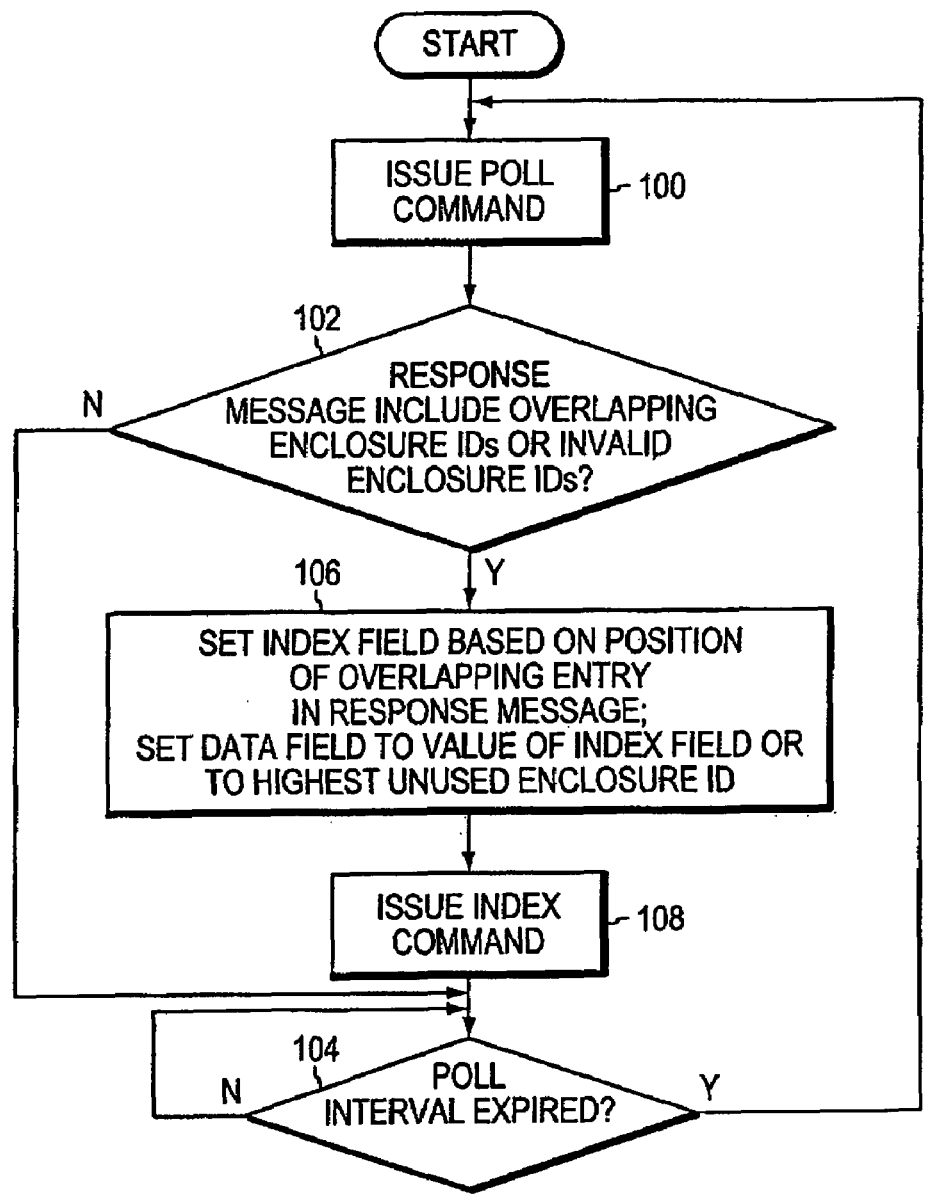
FIG. 16 is a flow diagram of another method of setting Enclosure IDs.

Referring to FIG. 16, during operation, The SP 22 periodically issues Poll commands 62 (100). As long as the entries received in the Response message 55 have distinct Enclosure IDs 38, no action is taken (102, 104). But, when a new enclosure 14 is added to an operational system, its Resume PROM 32 indicates its Enclosure ID as "0", which will cause an Enclosure ID overlap, or alternatively as a code that does not resolve as an Enclosure ID and therefore indicates that the enclosure does not have a valid ID. So, after the addition of the new enclosure 14 to the system, the SP 22 will receive a Response message 55 wherein two or more enclosures have Enclosure IDs 38 of "0", or wherein one or more enclosures have invalid Enclosure IDs 38 (102).

The SP 22 sets the index field 64 of and Index command 62 based on the position of the new enclosure 14 relative to enclosure "0", which is determined by the position of the entry 61 within the Response message 55 (106). The Index command 62 is then sent out on the bus (108), causing the new enclosure 14 to set its Enclosure ID to the value in the data field 50. The value in the data field 50 may be the same as the value of the index field 64, which would cause the Enclosure ID 38 of the new enclosure 14 to match its position in the cabinet 12. This is desirable if contiguous addressing is required, but is undesirable in that the newly set Enclosure ID 38 will likely conflict with the Enclosure ID 38 of the next enclosure 14 in the cabinet 12, causing the SP 22 to have to change Enclosure IDs 38 beyond the added enclosure 14. Alternatively, the SP 22 can set the data field 50 in the Index command 62 to the highest unused Enclosure ID 38 available. This way, the enclosures 14 may not have contiguous Enclosure IDs, but no further Enclosure ID changes need be made.

Note that the method shown in FIG. 16 may be used to initialize the system as well. In this case, the SP 22 issues a single Index Command 62 after each Poll command 60, rather than issuing successive Index commands 62 in response to a single Poll command 60 as was shown in FIG. 14.

Figure 17:
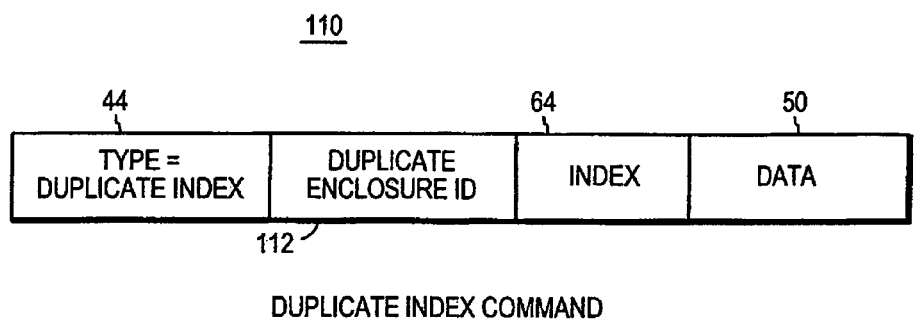
FIG. 17 shows the format of another type of Index command.
Figure 18:
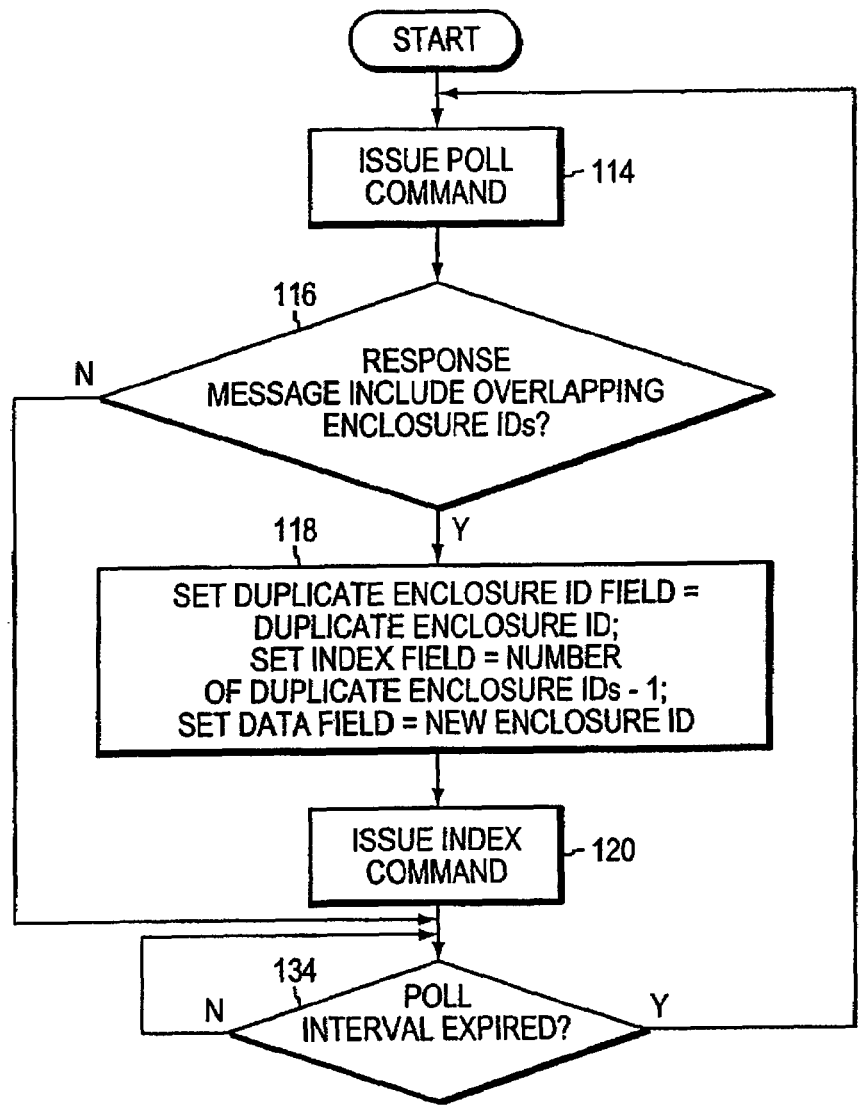
FIG. 18 is a flow diagram of another method of setting Enclosure IDs using the index command of FIG. 17.

In accordance with an alternate embodiment, a different type of Index command is provided. This Duplicate Index command 110 is shown in FIG. 17. The Duplicate Index command 110 includes a type field 44 identifying it as a Duplicate Index command, a duplicate Enclosure ID field 112, an index field 64 storing the number of duplicate Enclosure IDs−1, and a data field 50 for storing the new Enclosure ID 38 to be assigned. Referring to FIG. 18, the SP 22 issues a Poll command (114) and receives a Response message (116) indicating that several enclosures 14 have Enclosure IDs 38 set to "0". The SP 22 therefore issues a Duplicate Index command 110 with the duplicate Enclosure ID field 112 set to "0", the index field 64 storing the number of duplicate Enclosure IDs−1, and the data field 50 storing the Enclosure ID 38 to be assigned to one of the duplicate enclosures 14 (118).

Figure 19:
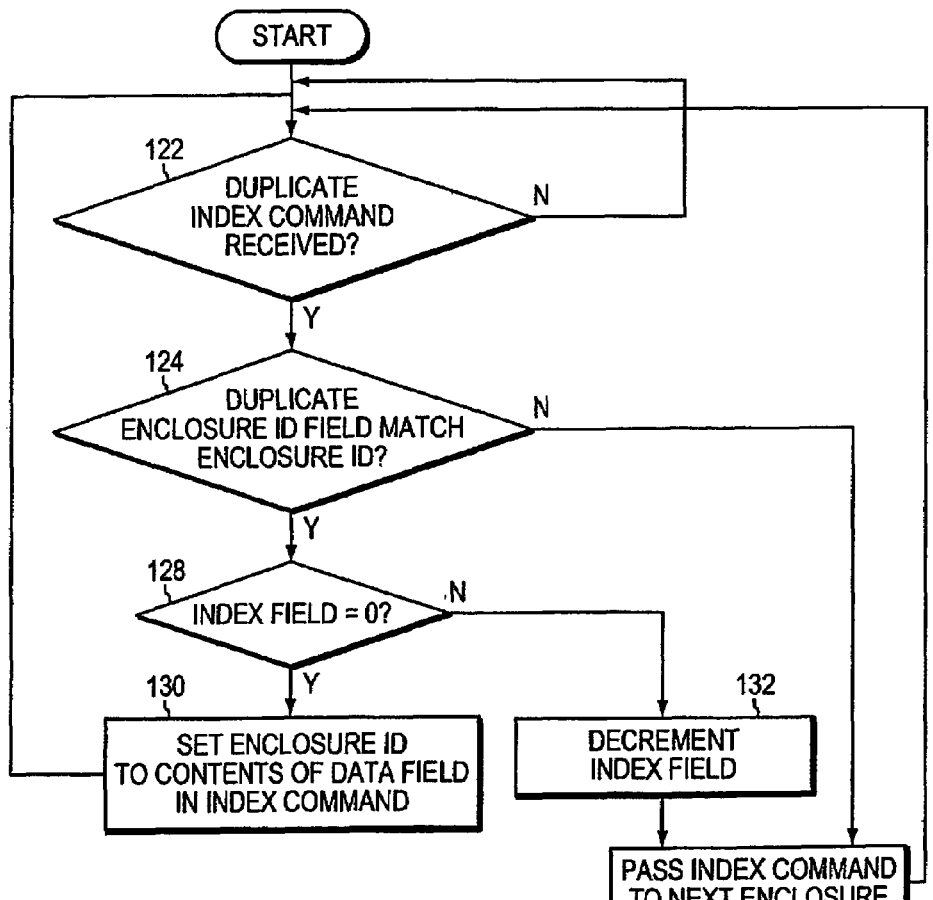
FIG. 19 is a flow diagram showing how enclosures respond to the index commands of FIG. 17.

Referring to FIG. 19, upon receipt of a Duplicate Index command 110 (122), an enclosure 14 checks the duplicate Enclosure ID field 112 to see if its Enclosure ID 38 matches this field (124). If not, the Duplicate Index command 110 is passed to the next enclosure 14 (126). If so, the enclosure 14's ID conflicts with another enclosure 14's ID. The enclosure 14 then checks the index field 64 to see if the number of duplicate Enclosure IDs−1 is set to "0"(128). If the index field 64 is set to "0", then this enclosure 14 is the last one in the cabinet 12 having the duplicate ID, so the enclosure 14 sets its new Enclosure ID 38 to the contents of the data field 50 (130). If the number of duplicate Enclosure IDs—1 in the index field 64 is not set to "0", then further enclosures 14 in the cabinet 12 have duplicate IDs. The enclosure decrements the index field 64 (132) and sends the Duplicate Index command 110 on to the next enclosure 14 (126).

The SP 22 will continue to periodically issue Poll commands 60 (134,114), and will continue to issue Duplicate Index commands 110 one at a time after each Poll Response message is received until all duplicate Enclosure IDs have been eliminated.

Figure 20:
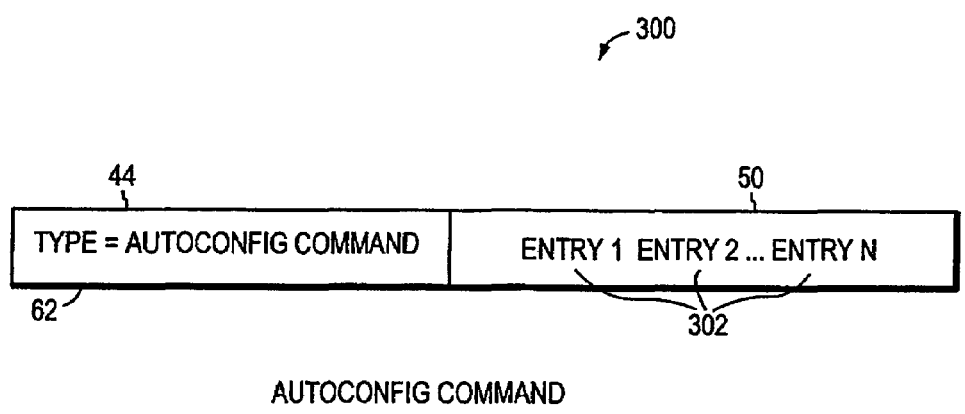
FIG. 20 shows the format of an Autoconfig command.
Figure 21:
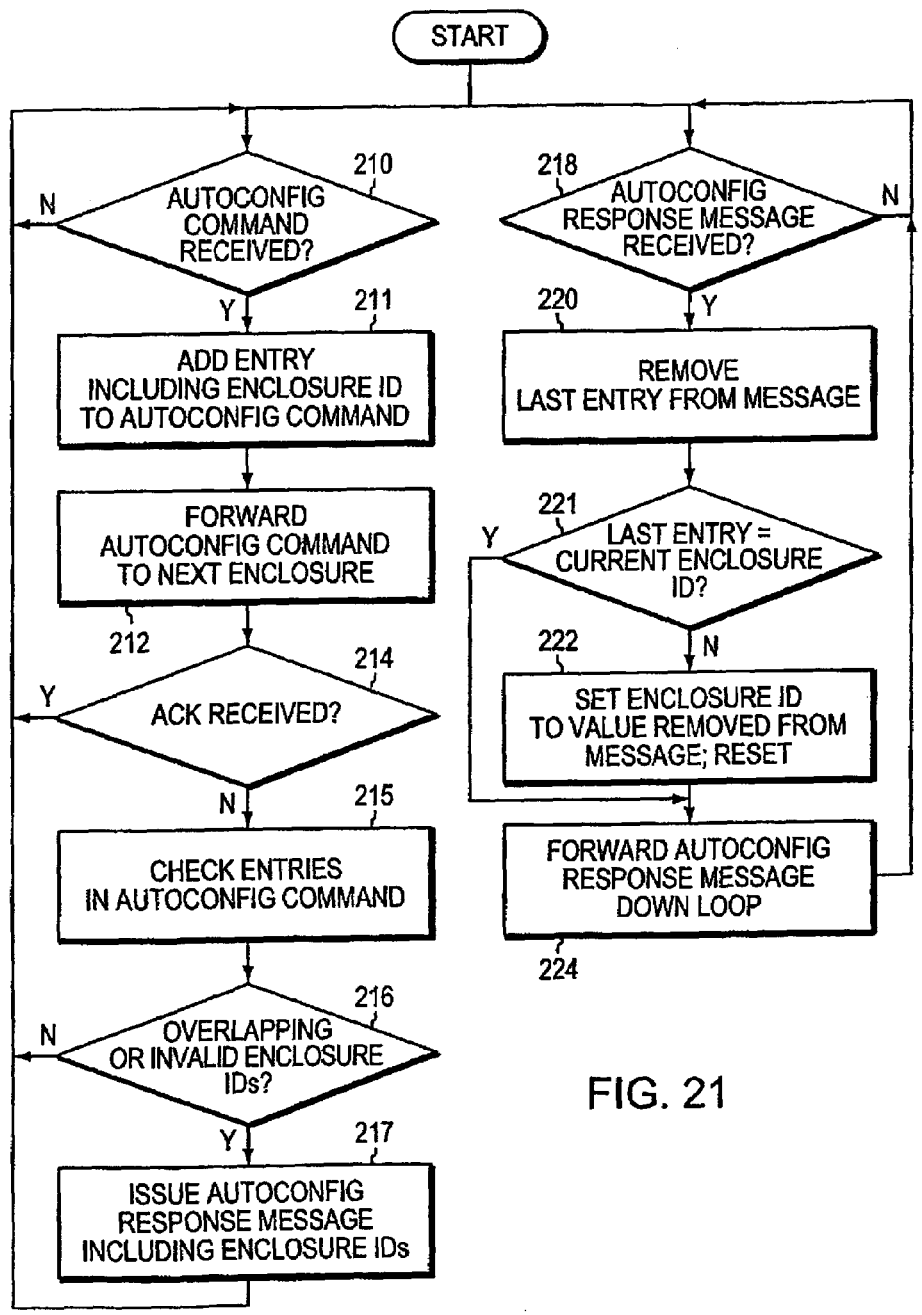
FIG. 21 is a flow diagram showing how Enclosure IDs can be set using Autoconfig commands and Autocofig Response messages.

In accordance with another embodiment, Enclosure IDs 38 are set by the last Enclosure 14 in the cabinet 12. A new type of command is provided for this purpose. Referring to FIG. 20, an Autoconfig command 300 is shown. The type field 44 identifies the command as an Autoconfig command. A data field 50 includes entries 302. Referring to FIG. 21, when an Autoconfig command 300 is issued by the SP 22, it is received by an enclosure 14 (210). The enclosure 14 adds an entry 302, including its Enclosure ID 38, to the Autoconfig command 300 (211). The enclosure 14 then forwards the Autoconfig command 300 to the next enclosure 14 on the loop (212). Each successive enclosure 14 adds its entry 302 and forwards the Autoconfig command 300 to the next enclosure 14. The receiving enclosure 14 sends an acknowledgement to the sending enclosure 14. If no acknowledge message is received after a certain time interval (214), then the enclosure 14 that sent the Autoconfig command 300 assumes it is the last enclosure 14 on the loop.

Figure 22:
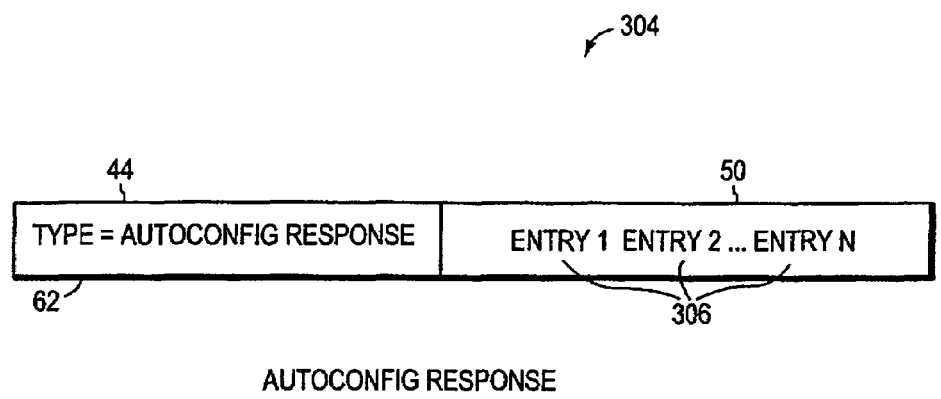
FIG. 22 shows the format of an Autoconfig Response message.

The last enclosure 14 on the loop can use the information in the Autoconfig command 300 to automatically cause the other enclosures to set their Enclosure IDs. This is preferably done by the LCC 26 in the last enclosure 14. The Autoconfig command 300 received by the last enclosure 14 informs the last enclosure 14 of all enclosures 14 below it. That is, the last enclosure knows how many enclosures are below it based on the number of entries 302 in the Autoconfig command 300. (215). The last enclosure can further examine the entries 302 to ascertain whether any Enclosure IDs overlap or are invalid (216). If so, the last enclosure 14 can prepare an Autoconfig Response message for setting Enclosure IDs 38 (217). The Autoconfig Response message 304 is shown in FIG. 22. The type field 44 identifies the message as an Autoconfig Response. The data field 50 includes entries 306 containing new Enclosure IDs 38. The number of Enclosure IDs is the same as the number of entries 302 the last enclosure detected in the Autoconfig command 300 it received. The last enclosure 14 can then send the Autoconfig Response message 304 back down the loop (216). Each enclosure 14 that receives the Autoconfig Response message (218) removes the last entry from the Autoconfig Response message (220) and compares it to its currently set Enclosure ID (221). If the entry 306 does not match the currently set Enclosure ID, the enclosure 14 sets its Enclosure ID to the contents of the entry 306 (222) and resets so that the new Enclosure ID will be written to the Resume PROM 25. The Autoconfig Response message 304 is then passed down to the next enclosure (224). Now, when the SP 22 issues its next Poll message 60, all the enclosures 14 will return their Enclosure IDs 38 in the Response message 55. Note that, as long as all Enclosure IDs 38 are set by the last enclosure 14, this method eliminates the need for the Index command 62. However, in an alternate embodiment, the LCC 24 on the last enclosure 14 can issue Index commands 62 to particular enclosures 14 having overlapping or invalid Enclosure IDs 38, in the same manner as has been described with regard to the SP 22.

Figure 23:
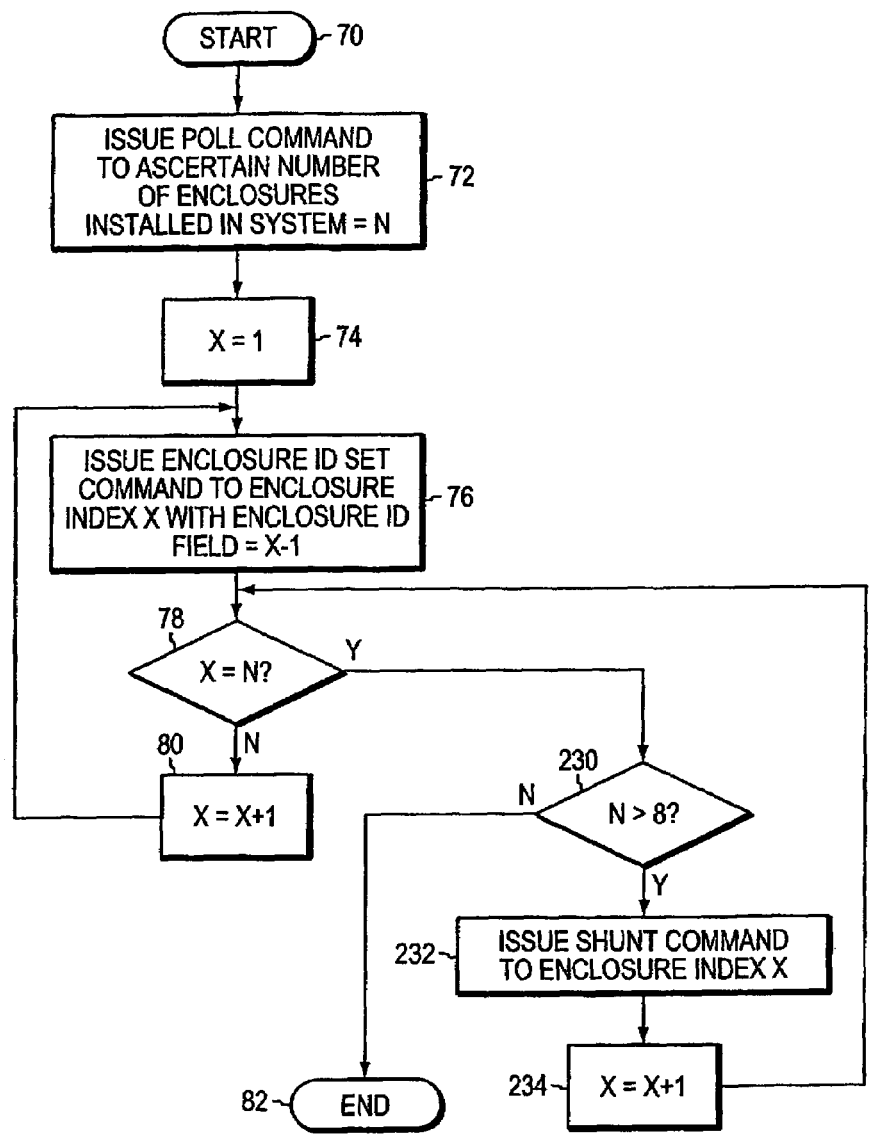
FIG. 23 is a flow diagram showing how extra enclosure can be automatically shunted from the loop.

According to a further aspect of the invention, an SP 22 can tell when too many enclosures 14 have been installed in a cabinet 12. Recall that only 120 drives 18 can be addressed on a given FC-AL. This means that no more than 8 enclosures 14 can be connected on an FC-AL. Referring to FIG. 23, an enhanced version of the initialization process of FIG. 14 is shown. If a ninth enclosure 14 is installed in the cabinet 12, the Response message 55 issued in response to a Poll command 60 will contain nine entries (230). The SP 22 can therefore tell that too many enclosures 14 are installed in the cabinet 12. The SP 22 can issue Index commands 62 to the first eight enclosures 14, but not the ninth, to set the Enclosure IDs 38 for the first eight enclosures 14. The SP 22 can then cause the ninth enclosure 14 to be shunted off the FC-AL (234). This functionality is particularly advantageous for sparing. A user might decide to add one or more extra enclosures 14 into a cabinet 12 as spares. The SP 22 will automatically shunt the spares until one is needed.

Figure 24:
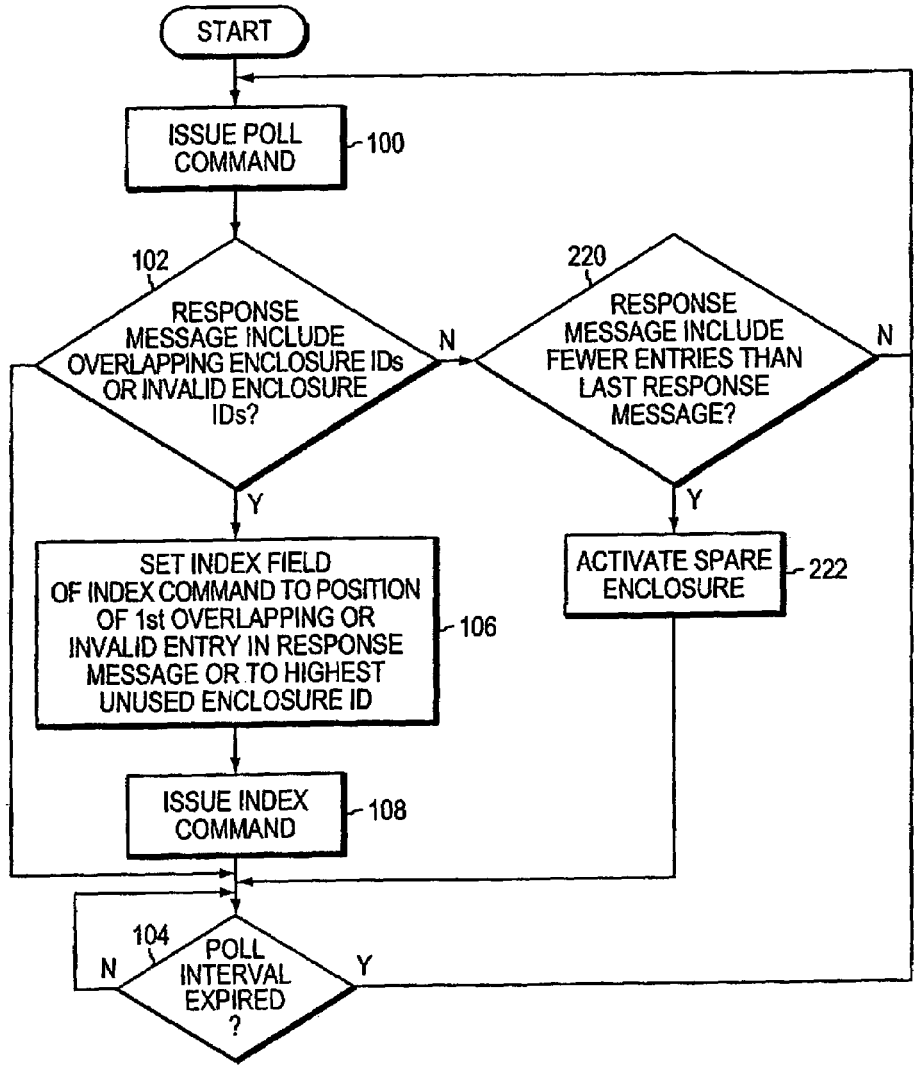
FIG. 24 is a flow diagram showing how spare enclosures can be activated and their Enclosure IDs set.

For example, referring to FIG. 24, if an operating enclosure 14 fails or is otherwise taken off-line, the SP 22 will receive a Response message 55 in response to its Poll command 60 that contains 1 fewer entries 61 that previously received Response messages 55 (220). The SP 22 can then automatically add a spare enclosure 14 to the loop and assign it an Enclosure ID 38 in accordance with the previously described methods. In particular, the SP 22 will send a management command to the shunted spare causing it to activate itself on the FC-AL (222). The newly activated spare will respond to the next Poll command 60 from the SP 22 by inserting its entry 61, including its Enclosure ID 38, in the Response message 55. The SP 22 will receive the Response message 55 and will ascertain that there is an overlapping or invalid entry 61 (202). The SP 22 will then issue an Index command 62, or a Duplicate Index command 110, to the spare enclosure 14 to set the spare enclosure 14's Enclosure ID 38 to the Enclosure ID 38 of the failed enclosure 14 (206, 208).

In the Diplex system as described in the previously cited U.S. patent, commands are issued by an SP 22 and responded to by the enclosures 14. One useful feature of the Diplex system is that management commands can be passed around the loop even when one or more enclosures 14 are not functional on the Fibre Channel loop. So, Poll commands can still be passed through and responded to by an otherwise non-functional enclosure 14. This information can be used to shunt the non-functional enclosure 14 from the loop. Further, the information can be used to move the non-functional enclosure's Enclosure ID to a spare enclosure 14 as previously described.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, the invention is useful in any environment where software controlled enclosure addressing is advantageous. For example, racks of computer or network equipment often need to be distinguished from one another. The present invention is useful for such purposes.

We claim:

1. Apparatus comprising:
    a plurality of enclosures, each enclosure containing a plurality of devices, each enclosure initially having a non-unique enclosure address associated with itself;
    logic for automatically setting a unique enclosure address for each enclosure for use in addressing devices in the enclosure;
    wherein each non-unique enclosure address indicates that the corresponding enclosure is not initialized; and
    the logic is configured to automatically set the unique enclosure address for each enclosure in response to detecting the non-unique enclosure address upon initialization of the enclosures.

2. Apparatus comprising:
a plurality of enclosures, each enclosure containing a plurality of devices, each device requiring a unique device address related to the enclosure in which it resides, each enclosure initially having a non-unique enclosure address associated with itself for use in addressing devices in the enclosure;
logic for setting a unique enclosure address for each enclosure for use in addressing devices in the enclosure;
wherein each non-unique enclosure address indicates that the corresponding enclosure is not initialized; and
the logic is configured to automatically set the unique enclosure address for each enclosure in response to detecting the non-unique enclosure address upon initialization of the enclosures.

3. The apparatus of claim 2 wherein the enclosures are interconnected by a communications medium, and wherein the logic causes messages to be exchanged between the enclosures via the communications medium to set the enclosure addresses.

4. The apparatus of claim 2 wherein the enclosure address is stored in a non- volatile memory.

5. The apparatus of claim 2 wherein the devices are disk drives.

6. The apparatus of claim 3 wherein the communications medium is a Fibre Channel Arbitrated loop, and wherein the unique device address is an ALPA.

7. A method comprising the steps of:
providing a plurality of enclosures, each enclosure containing a plurality of devices, each enclosure initially having a non-unique enclosure address associated with itself for use in addressing devices in the enclosure; and
automatically setting via software a unique enclosure address for each enclosure for use in addressing devices in the enclosure;
each non-unique enclosure address indicating that the corresponding enclosure is not initialized; and
automatically setting comprises automatically setting via software the unique enclosure address for each enclosure for use in addressing devices in the enclosure in response to detecting the non-unique enclosure address upon initialization of the enclosures.

8. A method comprising the steps of:
providing a plurality of enclosures, each enclosure containing a plurality of devices, each device requiring a unique device address related to the enclosure in which it resides, each enclosure initially having a non-unique enclosure address associated with itself for use in addressing devices in the enclosure; and
setting a unique enclosure address for each enclosure via software for use in addressing devices in the enclosure;
each non-unique enclosure address indicating that the corresponding enclosure is not initialized; and
setting the unique enclosure address comprises setting the unique enclosure address for each enclosure via software for use in addressing devices in the enclosure in response to detecting the non-unique enclosure address upon initialization of the enclosures.

9. The method of claim 8 wherein the enclosures are interconnected by a communications medium, and wherein the software causes messages to be exchanged between the enclosures via the communications medium to set the enclosure addresses.

10. The method of claim 8 wherein the enclosure address is stored in a non-volatile memory.

11. The method of claim 8 wherein the devices are disk drives.

12. The method of claim 11 wherein the communications medium is a Fibre Channel Arbitrated loop, and wherein the unique device address is an ALPA.

13. A program product comprising a computer readable medium having embodied therein a computer program for storing data, the program product comprising:
logic for detecting a non-unique enclosure address for each enclosure of a plurality of enclosures upon initialization of the enclosures, each non-unique enclosure address indicating that the corresponding enclosure is not initialized;
logic for automatically setting a unique enclosure address for each enclosure of the plurality of enclosures, each enclosure containing a plurality of devices, each enclosure initially having the non-unique enclosure address associated with itself, each enclosure address for use in addressing devices in the respective enclosure.

14. A program product comprising a computer readable medium having embodied therein a computer program for storing data, the program product comprising:
logic for detecting a non-unique enclosure address for each enclosure of a plurality of enclosures upon initialization of the enclosures, each non-unique enclosure address indicating that the corresponding enclosure is not initialized;
logic for setting a unique enclosure address for each enclosure of the plurality of enclosures, each enclosure containing a plurality of devices, each device requiring a unique device address related to the enclosure in which it resides, each enclosure initially having the non-unique enclosure address associated with itself, each enclosure address for use in addressing devices in the respective enclosure.

15. The program product of claim 14 wherein the enclosures are interconnected by a communications medium, and wherein the program product causes messages to be exchanged between the enclosures via the communications medium to set the enclosure addresses.

16. The program product of claim 14 wherein the enclosure address is stored in a non-volatile memory.

17. The program product of claim 14 wherein the devices are disk drives.

18. The program product of claim 17 wherein the communications medium is a Fibre Channel Arbitrated loop, and wherein the unique device address is an ALPA.

19. The apparatus of claim 1, wherein the logic is configured to:
send a poll message to the plurality of enclosures;
receive a response message in response to the poll message, the response message including enclosure addresses for each enclosure of the plurality of enclosures;
ascertain whether the enclosure addresses are unique for each enclosure of the plurality of enclosures;
ascertain a position of an enclosure that has a non-unique address when the enclosure addresses are not unique; and
send an index message to the enclosure at the ascertained position, the index message including a unique enclosure address for the enclosure at the ascertained position.

20. The apparatus of claim 19, wherein the index message includes an index field, wherein the index message is for receipt by successive enclosures, and wherein each successive enclosure comprises logic for examining the index field to determine whether it should process the message or pass it to the next successive enclosure.

21. The apparatus of claim 1, wherein the logic is configured to:
receive a poll message;
include the enclosure address of the enclosure in a response message generated in response to the poll message;
receive an index message including an index field and a new enclosure address;
examine the index field to ascertain whether the index message should be processed; and
replace the enclosure address with the new enclosure address if the index message should be processed.

22. The apparatus of claim 21 wherein, n response to examining the index field, the logic is configured to send the index message to another enclosure if the index message should not be processed.

23. The apparatus of claim 1, wherein:
each enclosure comprises a midplane having non-volatile memory configured to store the non-unique enclosure address of the enclosure; and
when automatically setting the unique enclosure address, a management interface of each enclosure is configured to receive a management message from an enclosure of the plurality of enclosures, decode the management message to retrieve the unique enclosure address, and write the unique enclosure address of the enclosure to the non-volatile memory of the midplane of the enclosure retrieved from the received management message.

24. The apparatus of claim 23, wherein:
a first enclosure of the plurality of enclosures comprises a system processor and each remaining enclosure of the plurality of enclosures comprises link control cards;
the system processor of the first enclosure is configured to initiate transmission of the management message among the plurality of enclosures; and
the link control cards are configured to form a Fibre Channel Arbitrated Loop among the plurality of devices of the plurality of enclosures when in operation, the plurality of devices being configured as disk drives.

25. The apparatus of claim 24, wherein the system processor of the first enclosure is configured to:
detect a number of enclosures connected on the Fibre Channel Arbitrated Loop; and
if the number of enclosures connected on the Fibre Channel Arbitrated Loop is greater than eight enclosures, transmit a management message to eight of the enclosures to cause the management interface of each of the eight enclosures to write the unique enclosure address of the enclosure to the non-volatile memory of the midplane of the enclosure.

26. The apparatus of claim 2, wherein:
each enclosure comprises a midplane having non-volatile memory configured to store the non-unique enclosure address of the enclosure; and
when automatically setting the unique enclosure address, a management interface of each enclosure is configured to receive a management message from an enclosure of the plurality of enclosures, decode the management message to retrieve the unique enclosure address, and write the unique enclosure address of the enclosure to the non-volatile memory of the midplane of the enclosure retrieved from the received management message.

27. The apparatus of claim 26, wherein:
a first enclosure of the plurality of enclosures comprises a system processor and each remaining enclosure of the plurality of enclosures comprises link control cards;
the system processor of the first enclosure is configured to initiate transmission of the management message among the plurality of enclosures; and
the link control cards are configured to form a Fibre Channel Arbitrated Loop among the plurality of devices of the plurality of enclosures when in operation, the plurality of devices being configured as disk drives.

28. The apparatus of claim 27, wherein the system processor of the first enclosure is configured to:
detect a number of enclosures connected on the Fibre Channel Arbitrated Loop; and
if the number of enclosures connected on the Fibre Channel Arbitrated Loop is greater than eight enclosures, transmit a management message to eight of the enclosures to cause the management interface of each of the eight enclosures to write the unique enclosure address of the enclosure to the non-volatile memory of the midplane of the enclosure.

* * * * *